E. F. NORELIUS.
GUN CARRIAGE.
APPLICATION FILED NOV. 12, 1917.

1,327,603.

Patented Jan. 6, 1920.
2 SHEETS—SHEET 1.

WITNESSES:
Charles Rohles
J.C. Benesch

INVENTOR
Emil F. Norelius
BY Strong & Townsend
ATTORNEYS

E. F. NORELIUS.
GUN CARRIAGE.
APPLICATION FILED NOV. 12, 1917.

1,327,603.

Patented Jan. 6, 1920.
2 SHEETS—SHEET 2.

WITNESSES:
Charles Rekles
J. C. Benesch.

INVENTOR
Emil F. Norelius
BY Strong & Townsend
ATTORNEYS

UNITED STATES PATENT OFFICE.

EMIL F. NORELIUS, OF PEORIA, ILLINOIS, ASSIGNOR TO THE HOLT MANUFACTURING COMPANY, OF STOCKTON, CALIFORNIA, A CORPORATION OF CALIFORNIA.

GUN-CARRIAGE.

1,327,603. Specification of Letters Patent. Patented Jan. 6, 1920.

Application filed November 12, 1917. Serial No. 201,581.

*To all whom it may concern:*

Be it known that I, EMIL F. NORELIUS, a citizen of the United States, residing at Peoria, in the county of Peoria and State of Illinois, have invented new and useful Improvements in Gun-Carriages, of which the following is a specification.

This invention relates to carriages for large guns of the howitzer type. For this purpose I employ a truck mechanism of the self-laying track type which, on account of its large ground-engaging surface, is capable of sustaining a heavier load on soft ground than any other form of truck mechanism.

Chief among the objects of my invention is to provide means for taking the firing strains off of the truck rollers and track rails; and also to provide means to retard the movement of the truck mechanism as a whole, due to the recoil of the gun.

One form which my invention may assume is exemplified in the following description and illustrated in the accompanying drawings, in which—

Figure 1:
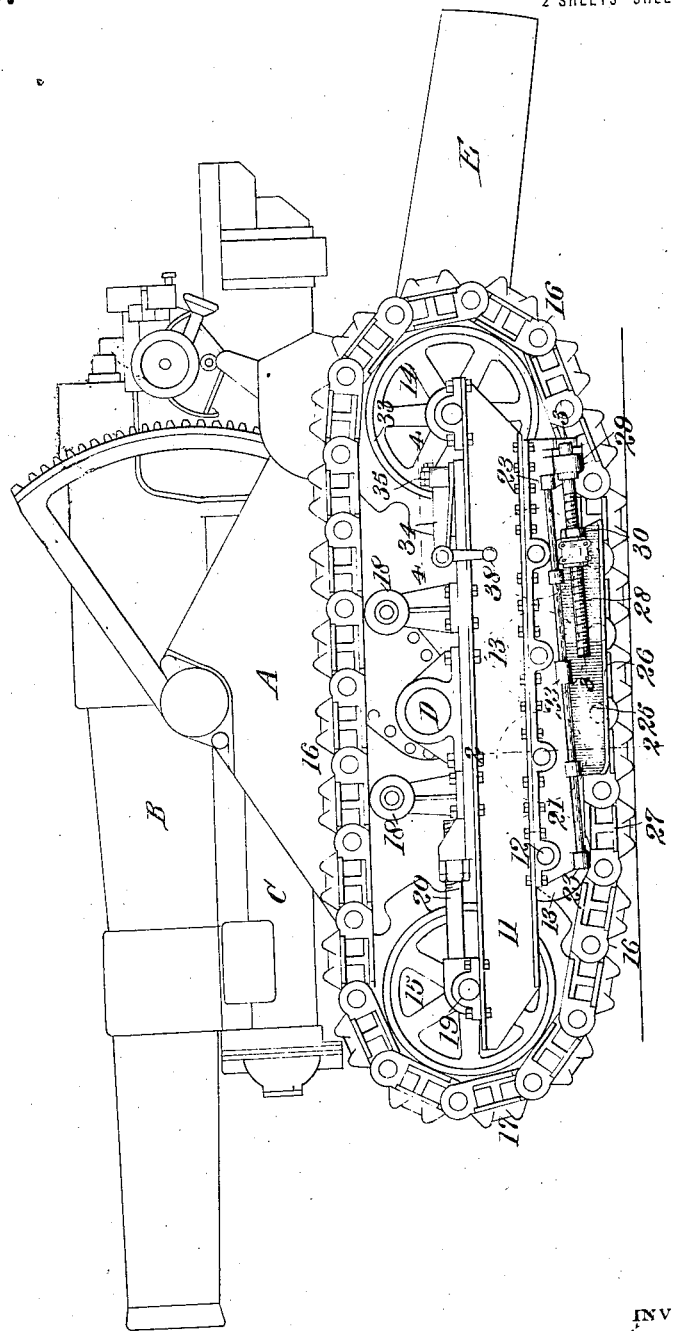
Figure 1 shows a side elevation of a device embodying my invention.
Figure 2:
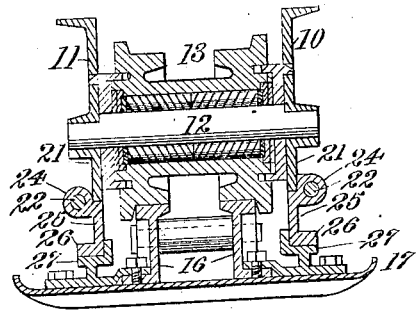
Fig. 2 shows a sectional view on the line 2—2 of Fig. 1.
Figure 3:
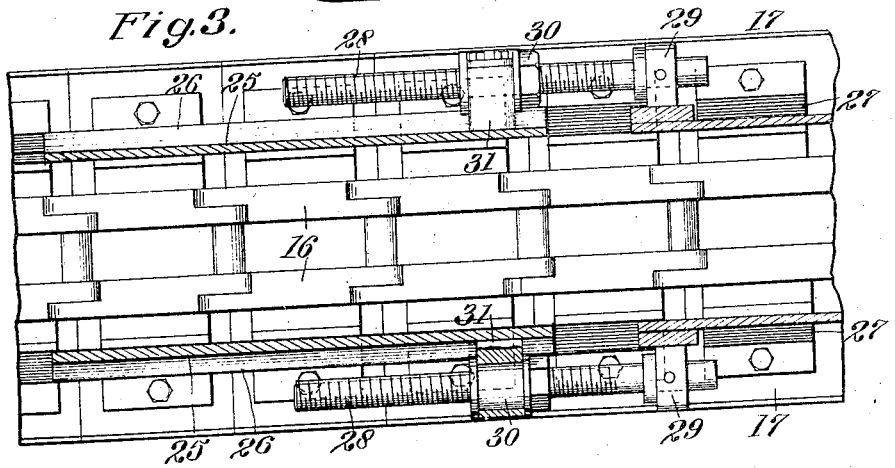
Fig. 3 is a sectional view on the line 3—3 of Fig. 1.
Figure 4:
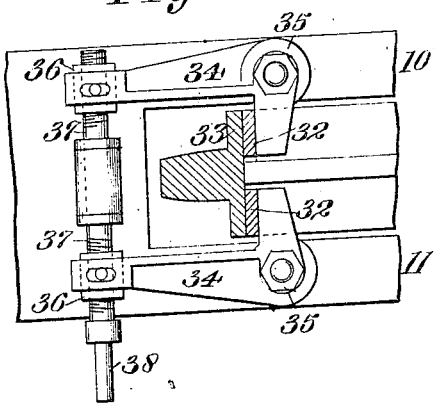
Fig. 4 is a sectional view on the line 4—4 of Fig. 1.

In the form here shown, I provide a base A for a gun B, the gun being mounted in any approved way upon the base to vary its range and traverse and having suitable recoil mechanism C. The gun base is supported upon a pair of roller truck frames, one at each side, through the agency of an axle D. A trail E, integral with the gun base, projects rearwardly to engage the ground and form a third point of support when the gun is in use and also to provide a draw bar for the carriage mechanism.

Each roller truck frame includes a pair of spaced side bars 10 and 11, preferably in the form of a channel beam, between which are journaled, on spindles 12, a series of flanged rollers 13. At opposite ends of the truck frames are front and rear sprocket wheels 14 and 15, respectively, and passing around said sprocket wheels is an endless, flexible, self-laying track made up of a series of articulated link sections 16, the side bars of which are formed with rail heads to provide a track surface at the ground stretch of the track for the rollers 13.

Each link carries a grouser or shoe 17 projecting at opposite sides thereof for some distance. Idler rollers 18 are arranged on the top of each truck frame to support the upper run of the track. The rear sprocket wheel 15, preferably, is mounted in shiftable bearings 19 and has an adjustable thrust bar 20 connecting it with the truck frame, whereby the sprocket wheel may be shifted back and forth to produce or reduce slack in the chain. The truck members, it will be seen, are free to rock about the axle D and when the carriage is drawn along, the tracks will ride over irregularities on the surface of the ground without imparting undue shocks to the gun mechanism.

Since the carriage is intended for large guns of the howitzer type, it is important to relieve the truck rollers, and track rails of the severe strains due to the firing of the gun. This I accomplish by arranging a downwardly extending angle bar 21 on each side bar of each truck frame, said bar 21 being inclined at its lower edge rearwardly and upwardly. To each of these bars 21 I fix a rod 22 in bearings 23 at the lower outer portion thereof, said rod being also inclined in the same direction as the lower edge of the bar 21.

Slidably connected to each rod 22, by means of loops 24, is a wedge-shaped plate 25 having its upper edge engaging the lower edge of the bar 21 and its bottom edge provided with a flange 26 to coöperate with a flanged rail 27 fixed on the projecting side of the underlying shoes or grousers. The wedge plate when advanced will have the effect of raising the truck frame from the track so as to relieve all strains from the rollers and track rails.

When the gun carriage is to be transported the wedge plates are retracted and move upwardly on the rods 22 to permit the truck rollers to again engage the track rails. Any one of a variety of mechanisms can be used for moving the wedge plates back and forth, and I show in the present instance a screw 28 fixed at one end in a support 29 depending from the forward end of each bar 21 and passing through a screw-threaded sleeve or nut 30 rotatably and non-slidably mounted in a bearing 31 fixed to the wedge plate.

Turning of the nut, by means of a wrench or otherwise, causes the wedge plate to be moved longitudinally.

Owing to the employment of a self-laying track type of mechanism, I am enabled effectively to retard the movement of the carriage as a whole, due to the recoil of the gun, simply by braking one of the sprocket wheels at each side. I show in connection with each of the front sprocket wheels a brake shoe 32 at each side thereof to coöperate with an annular flange 33 on the wheel. Each shoe is carried on one arm of a bell-crank lever 34, pivoted at 35 to the truck frame and having its other end projecting rearwardly and fitted with a screw-threaded sleeve 36 pivoted thereon. A screw shaft 37 passes through the sleeves of the two adjacent bell cranks and is equipped with a crank 38 for moving the outer ends of the bell-cranks apart, whereby to set the brake shoes against the sprocket wheel. Since the sprocket wheels engage teeth on the track the braking of the wheels prevents movement of the truck frame relatively to the track, and inasmuch as the tracks will not slide readily it will be seen that a very effective retardation of the carriage mechanism in a fore and aft direction is provided.

Having thus described my invention, what I claim and desire to secure by Letters Patent is—

1. A gun carriage comprising a roller-carrying truck frame, an endless, flexible, self-laying track, on the ground stretch of which the rollers operate, and means carried by the truck frame and resting upon the ground stretch of the track to raise said frame relatively to the track to relieve the rollers of the strains of gun fire.

2. A gun carriage comprising a truck frame fitted with rollers, an endless, flexible, self-laying track, upon the ground stretch of which the rollers operate, ground-engaging shoes carried by the track and projecting laterally at each side thereof, and means interposed between the track shoes at the bottom run thereof and the truck frame for raising the latter to relieve the strains of gun fire from the rollers and track.

3. A gun carriage comprising a truck frame fitted with rollers, an endless, flexible, self-laying track, upon the ground stretch of which the rollers operate, ground-engaging shoes carried by the track and projecting laterally at each side thereof, and means interposed between the track shoes at the bottom run thereof and the truck frame for raising the latter to relieve the strains of gun fire from the rollers and track, said means comprising a wedge-shaped block engaging the truck frame and the shoes and movable longitudinally relatively thereto.

4. A gun carriage comprising a truck frame fitted with rollers, an endless, flexible, self-laying track, upon the ground stretch of which the rollers operate, ground-engaging shoes carried by the track and projecting laterally at each side thereof, means interposed between the track shoes at the bottom run thereof and the truck frame for raising the latter to relieve the strains of gun fire from the rollers and track, said means comprising a wedge-shaped block, engaging the truck frame and the shoes and movable longitudinally relatively thereto, and a screw feeding device for operating said wedge block.

5. A gun carriage comprising a truck frame fitted with rollers, an endless, flexible, self-laying track, upon the ground run of which the rollers operate, ground-engaging shoes carried by the track and projecting laterally at each side thereof, a bar depending from the truck frame at each side thereof and having an inclined lower edge, a wedge plate carried slidably thereby for longitudinal movement and engaging the inclined edge of the bar, rail members on the projecting bars of the track shoes with which the lower edge of the wedge plate is adapted to coöperate, and means for moving the wedge plate longitudinally of the track to raise the truck frame relatively to the track.

6. In an endless, self-laying track vehicle, the combination of a truck frame provided with truck rollers, an endless, self-laying track enveloping the truck and upon which the truck rollers run, and a jack carried by the truck frame for elevating the truck frame from the track.

7. In an endless, self-laying track vehicle, the combination of a truck frame provided with truck rollers, an endless, self-laying track enveloping the truck and upon which the truck rollers run, and a jack carried by the truck frame for elevating the truck frame from the track, said jack including a traveling wedge and coöperative surfaces on the track and truck frame.

8. A gun carriage comprising a roller carrying truck frame, an endless, flexible, self-laying track on the ground run of which the rollers operate, ground engaging shoes carried by the track and projecting laterally at each side thereof, and means carried by the truck frame to lock the ground run of shoes to the truck frame and to raise said frame relatively to the track, whereby movement of the gun carriage due to the recoil of the gun is prevented and the track and rollers are relieved of the strains of gun fire.

9. A gun carriage comprising a roller carrying truck frame, an endless, flexible, self-laying track upon the ground run of which the rollers operate, ground engaging shoes carried by the track and projecting laterally at each side thereof, sprocket wheels upon which the track is carried, a brake mechanism carried by the truck frame for one of said sprocket wheels for locking said wheel to the truck frame, and means carried by the truck frame to lock the ground run of shoes to the truck frame and to raise said frame relatively to the track, whereby movement of the gun carriage due to the recoil of the gun is prevented and the track and rollers are relieved of the strains of gun fire.

10. In an endless, self-laying track vehicle, the combination of a truck frame provided with truck rollers, an endless, flexible, self-laying track having rails upon the ground run of which the rollers operate, ground engaging shoes carried by the track rails and projecting laterally at each side thereof, and means for supporting said frame on the ground run of the ground engaging shoes independently of the track rails and rollers, whereby said track rails and rollers are relieved of the strains of gun fire.

In testimony whereof I have hereunto set my hand in the presence of two subscribing witnesses.

EMIL F. NORELIUS.

Witnesses:
ROBERT W. GOTSHALL,
WILLIAM TURNBULL.